Oct. 15, 1929.   C. B. HUDSON   1,731,817
COLLAPSIBLE TIRE BUILDING DRUM
Filed Aug. 31, 1927   2 Sheets-Sheet 1
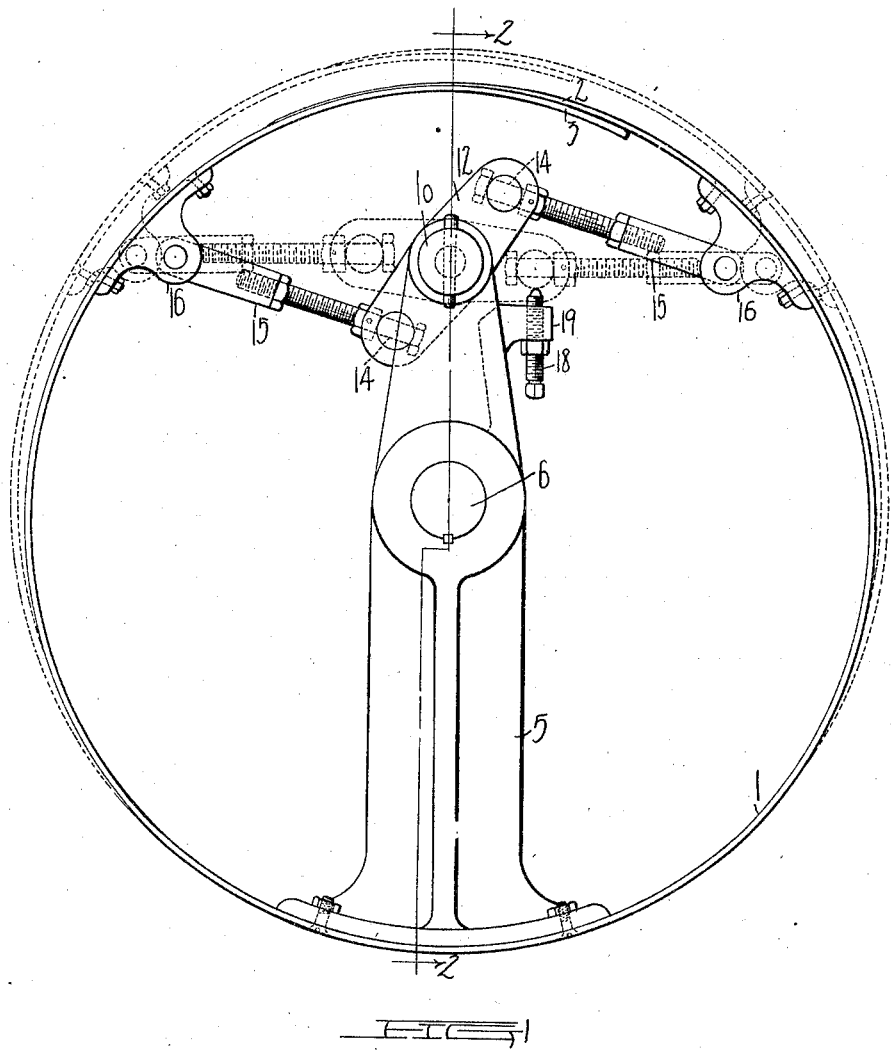
INVENTOR.
Charles B. Hudson.
BY
ATTORNEYS.

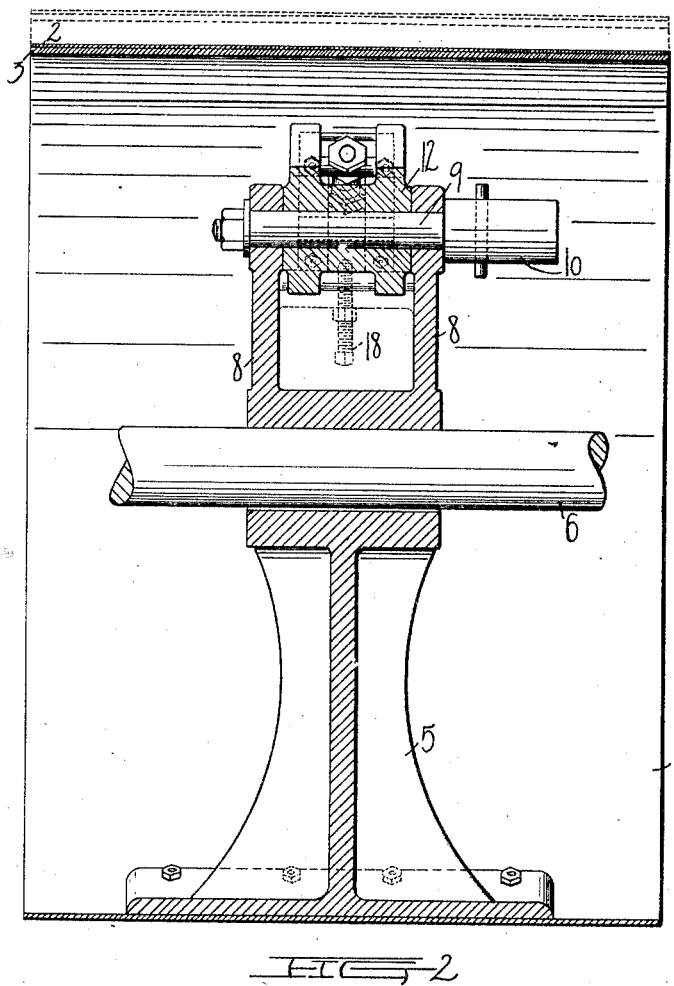

Patented Oct. 15, 1929

1,731,817

UNITED STATES PATENT OFFICE

CHARLES B. HUDSON, OF AKRON, OHIO, ASSIGNOR TO THE AKRON STANDARD MOLD COMPANY, OF AKRON, OHIO, A CORPORATION OF OHIO

COLLAPSIBLE TIRE-BUILDING DRUM

Application filed August 31, 1927. Serial No. 216,602.

This invention relates to collapsible drums or forms such as used in the manufacture of automobile tire casings by the "flat band" method, and the purpose of the invention is to construct an economical, easily operated device of this type in which the collapsing mechanism is simpler and more easily operated than in forms prior to this invention.

The new form of collapsible tire building drum comprises a flexible sheet metal drum or pulley which forms the base upon which the pulley band is constructed, which is split so that it can be collapsed by drawing the ends of the drum over one another by a simple and easily operated toggle mechanism. The details of the expanding and contracting device are not essential to the invention in its broader aspects, as other actuating mechanisms may be employed to expand and contract the flexible drum.

The invention may be embodied in many ways which are variations or modifications of the specific details herein, it being understood that the claims are to be given a scope sufficient to cover alterations and modifications which fall within the scope of the invention as set forth therein.

In the drawings,

Figure 1 is a side elevation of the tire building drum or form shown in collapsed position in full lines and in expanded position in dotted lines; and Figure 2 is a section on the line 2—2 of Figure 1.

The tire building form or drum is composed of an outer flexible sheet metal shell or casing 1 which is split at one point, being provided with overlapping ends or wings 2 and 3, the outer wing 2 being tapered so as to provide the least possible break in circular continuity of the drum when in expanded position.

At the point in the shell opposite the split, it is attached to a rigid bracket or supporting arm or spider 5 which is keyed to the shaft 6 of the tire building machine or stand. The end of the arm which extends beyond the shaft is bifurcated, being provided with parallel arms 8 in which is rotatably mounted the collapsing or drum operating shaft 9 having a head 10 thereon to be engaged by a wrench or other tool to collapse and expand the drum. Fixed to the shaft 9 between the arms 8 is a double crank 12 in the ends of which are pivotally mounted rock shafts 14 carrying links 15 extending in opposite directions and each connected to a block 16 attached to the end of the drum near the split therein. The links 15 are preferably made adjustable as shown for the purpose of varying the effective circumference of the building drum. When the drum is fully expanded, the crank 12 is slightly past center, being held in that position by a set screw 18 located in a bracket 19 on the supporting arm 5, so that the collapsible drum is rigid at all times. When operating the drum, rotation of the shaft 9 will collapse the drum from the dotted line to the full line positions as shown in Figure 1.

The outer periphery of the drum is shown as a plain cylinder, although other shapes and configurations of the drum may be made as dictated by the requirements of the tire manufacturer, and other changes and modification may be resorted to without altering the salient features of the invention.

What is claimed is:

1. A tire building drum for the manufacture of tires by the "flat band" method, comprising a one-piece, flexible sheet of metal constituting the periphery of the drum, the edges of the sheet overlapping, and a collapsing mechanism located within the drum and connected to the sheet near the edges thereof, the said mechanism being operable to cause the edges of the sheet to slide upon one another.

2. A tire building drum for the manufacture of tires by the "flat band" method, having a flexible metal periphery, which metal is split at a single point, the edges thereof overlapping, and a collapsing mechanism located within the drum and connected to the drum near the edges thereof, the said mechanism being operable to cause the edges of the metal to slide upon one another.

3. A tire building drum for the manufacture of tires by the "flat band" method, comprising a one-piece, flexible sheet of metal constituting the periphery of the drum, the edges of the sheet overlapping, a crank located within the drum, and links connecting the crank with the drum near the edges thereof.

4. A tire building drum for the manufacture of tires by the "flat band" method, comprising a one-piece, flexible sheet of metal constituting the periphery of the drum, the edges of the sheet overlapping, a crank located within the drum, and links connecting the crank with the drum near the edges thereof, the links being swung past center when the drum is expanded to its full extent.

CHARLES B. HUDSON.